United States Patent
Desprez et al.

(10) Patent No.: US 7,674,995 B2
(45) Date of Patent: Mar. 9, 2010

(54) METHOD OF PROCESSING POSTAL ITEMS INCLUDING MANAGEMENT OF DIGITAL FINGERPRINTS OF THE POSTAL ITEMS

(75) Inventors: Olivier Desprez, Versailles (FR); Christophe Caillon, Bretigny sur Orge (FR); Emmanuel Miette, Saint-Gratien (FR)

(73) Assignee: Solystic, Gentilly Cedex (FR)

( * ) Notice: Subject to any disclaimer, the term of this patent is extended or adjusted under 35 U.S.C. 154(b) by 0 days.

(21) Appl. No.: 10/562,973

(22) PCT Filed: Dec. 1, 2005

(86) PCT No.: PCT/FR2005/051020

§ 371 (c)(1), (2), (4) Date: Dec. 29, 2005

(87) PCT Pub. No.: WO2006/100357

PCT Pub. Date: Sep. 28, 2006

(65) Prior Publication Data

US 2008/0149540 A1 Jun. 26, 2008

(30) Foreign Application Priority Data

Mar. 24, 2005 (FR) .................................. 05 50775

(51) Int. Cl.
*G06K 9/00* (2006.01)
*B07C 5/00* (2006.01)

(52) U.S. Cl. ..................... 209/584; 209/900; 382/101

(58) Field of Classification Search ................ 209/584, 209/900; 382/101, 102
See application file for complete search history.

(56) References Cited

U.S. PATENT DOCUMENTS

| 6,697,500 | B2 * | 2/2004 | Woolston et al. | 382/101 |
| 6,888,084 | B1 * | 5/2005 | Bayer | 209/584 |
| 7,356,162 | B2 * | 4/2008 | Caillon | 382/101 |
| 2005/0123170 | A1 * | 6/2005 | Desprez et al. | 382/101 |

FOREIGN PATENT DOCUMENTS

| EP | 1 222 037 A1 | | 7/2002 |
| FR | 2 841 673 A | | 1/2004 |
| WO | WO01/23108 | * | 4/2001 |
| WO | WO2005/089966 | * | 9/2005 |

* cited by examiner

*Primary Examiner*—Patrick H Mackey
*Assistant Examiner*—Mark Hageman
(74) *Attorney, Agent, or Firm*—Sughrue Mion, PLLC

(57) ABSTRACT

The invention concerns a method for processing postal packets including managing digital impressions of the postal packets. In a method for processing postal packets, during a preliminary sorting of the packets, a digital image of a packet comprising an address information is formed, a digital impression (V-Id) is derived from said image which constitutes a logical identifier for the packet and the packet impression is recorded in memory corresponding to data indicating the packet address information, and during a second sorting of the packets, a digital image of a current packet is formed again (51) comprising an address information, a digital impression for the current packet is derived (52) from said image and a search is performed among the recorded impressions in the preliminary sorting for a match with the current packet impression.

7 Claims, 4 Drawing Sheets

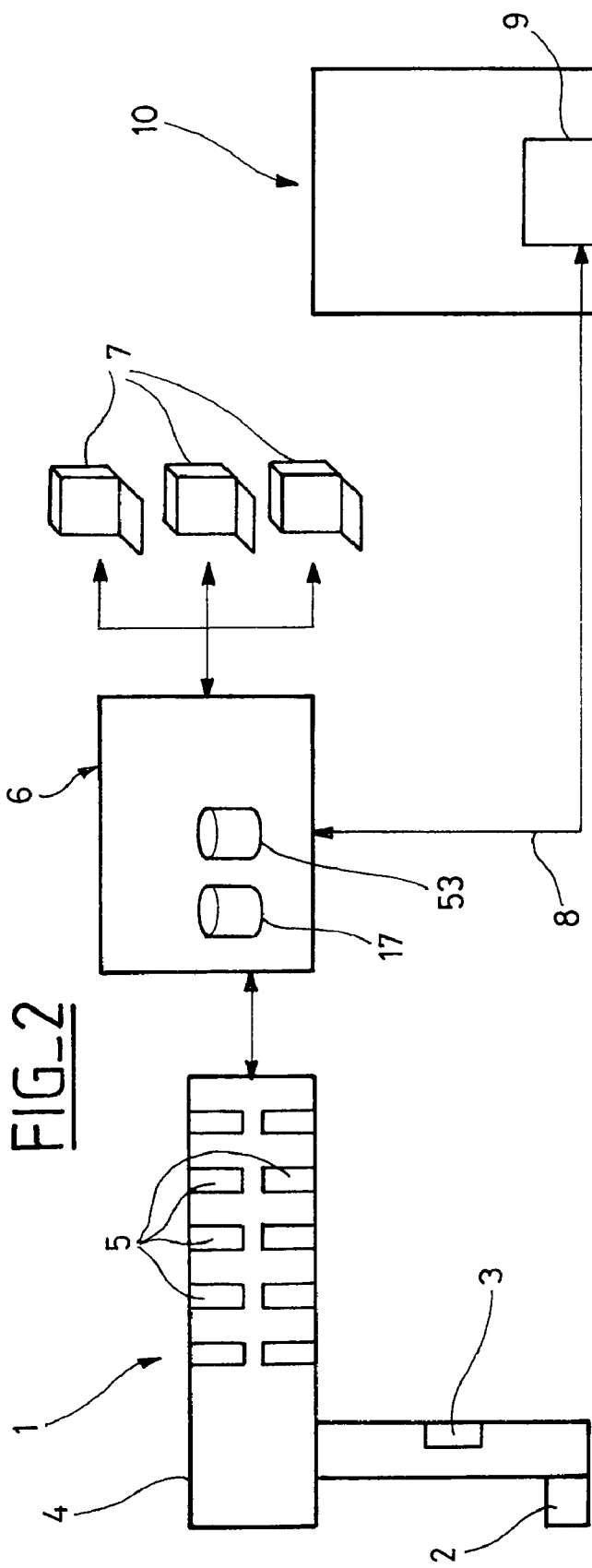

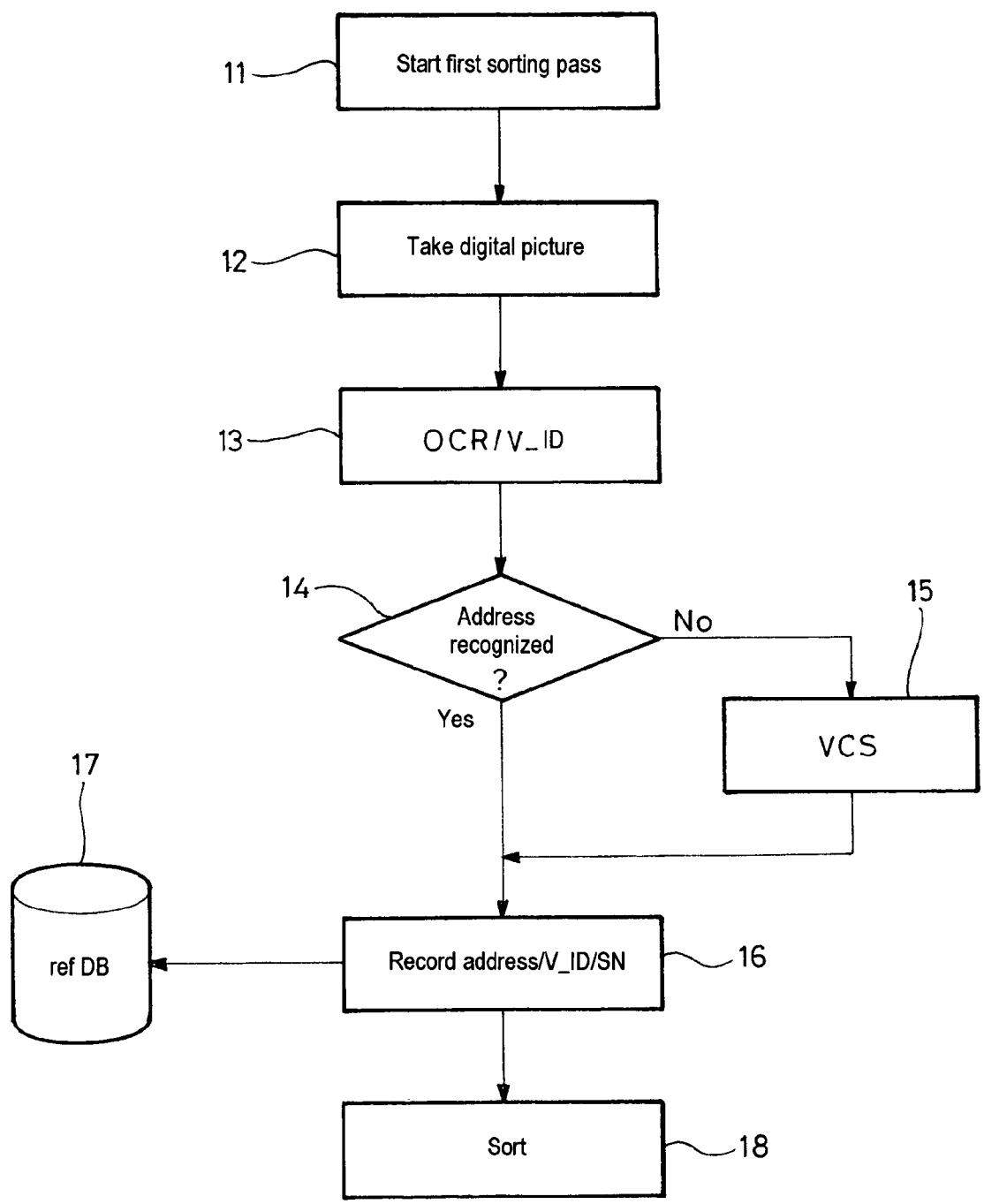

FIG_4
| SN | |
|---|---|
| 01407600 | V_Id.71 |
| 01407601 | V_Id.72 |
| --- | --- |
| 01407640 | V_Id.7n |
| --- | --- |
| 014008600 | V_Id 81 |
| 014008601 | V_Id.82 |
| --- | --- |
| 014008640 | V_Id.8n |
| --- | --- |
| SN | PI |
|---|---|
| --- | --- |
| 014008628 | 374 |
| 014008629 | 375 |
| 014008630 | 376 |
| 014008631 | 377 |
| 014008632 | 378 |
| 014008634 | 379 |
| 014008635 | 381 |
| 014008633 | 382 |
| 014008637 | 383 |
| 014008634 | 384 |
| 014008639 | 385 |
| ? | 386 |
| --- | --- |
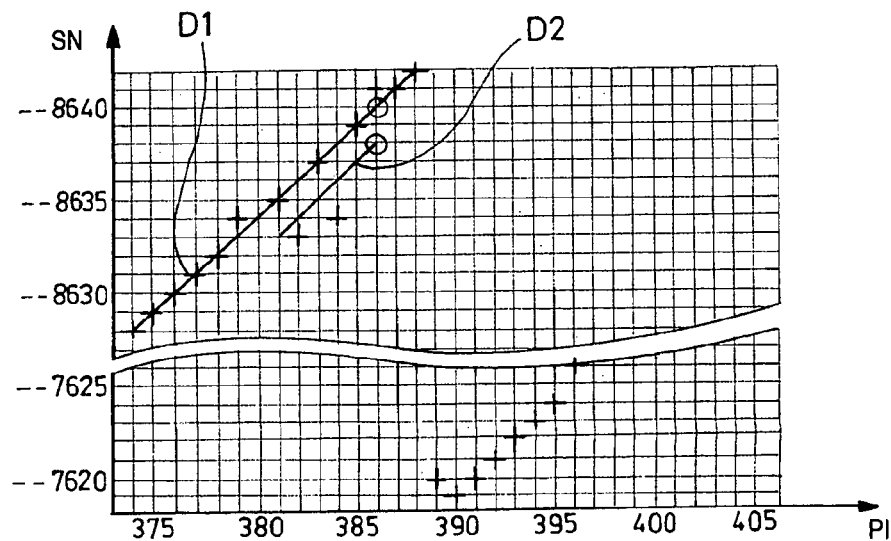
FIG_6

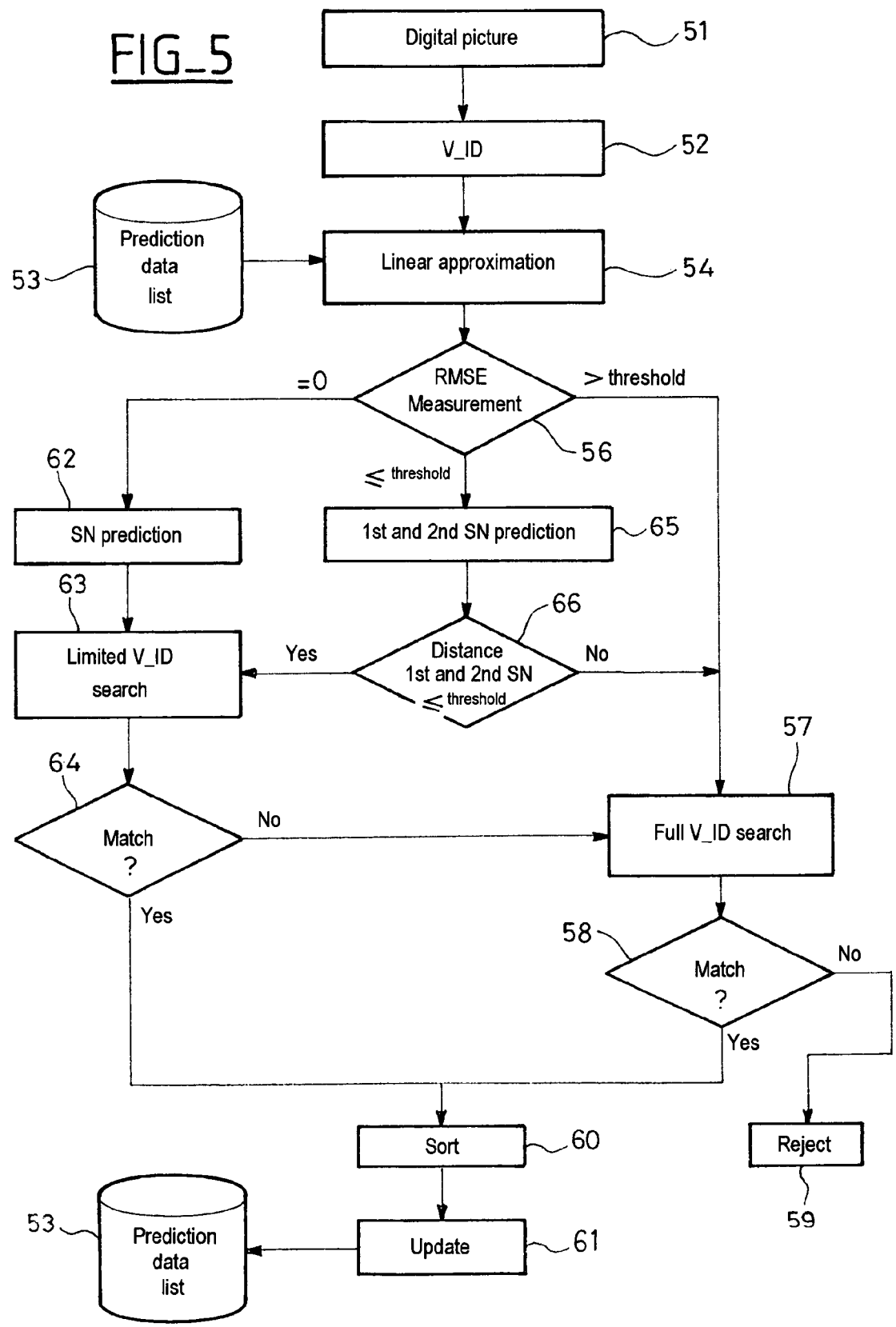

METHOD OF PROCESSING POSTAL ITEMS INCLUDING MANAGEMENT OF DIGITAL FINGERPRINTS OF THE POSTAL ITEMS

BACKGROUND OF THE INVENTION

The invention relates to a method of processing postal items, which method consists, during a first pass for sorting the items, in taking a digital picture of a postal item bearing address information, in deriving from said picture a digital fingerprint which is a logic identifier for the item, and in storing the fingerprint of the item in a memory in correspondence with data about the item, in particular with data indicative of the address information of the item, and consists, during a second pass for sorting the items, in taking again a digital picture of a current mail item bearing address information, in deriving from said image a digital fingerprint for the current item, and in searching the fingerprints recorded in the first sorting pass for a match with the fingerprint of the current item in order to retrieve the address data of the current item by association.

With such a method, it is unnecessary for every postal item to have an identity code affixed thereto, which code is commonly referred to in the literature as an "ID tag" and can be in the form of a bar code, for example, because a virtual item identifier constituted by the fingerprint of the item is used instead. In practice, the fingerprint is an image signature that is, for example, made up of two components, one of the components characterizing the overall and local distributions of the shades of gray in the image of the item, for example, and the other component characterizing the address information contained in the image of the item at a non-syntactical level of analysis.

However, the use of digital fingerprints raises the problem of searching for a match between a current digital fingerprint and a large number of recorded digital fingerprints, giving rise firstly to difficulty in satisfying real-time requirements, and secondly to a higher probability of confusion in searching for matches. The higher the number of recorded digital fingerprints that are compared with the current fingerprint, the higher the probability of detecting a match between two fingerprints that correspond to two different postal items. Therefore, use of digital fingerprints requires the search for fingerprint matches to be confined to a limited exploration space.

European Patent Document EP 1 222 037 describes a method as defined above that uses fingerprints to identify the items but that, during the second sorting pass, requires the items sorted in the first pass to be fed back into the inlet of the machine in a certain order so that the search for fingerprint matches takes place within a limited exploration space. For that purpose, the sorting outlet bins that contain the items sorted in the first sorting pass must be identified by the machine when the items are fed back in for the second sorting pass, and the fingerprints in the memory must be organized into sequences, each sequence being attributed to a first-pass sorting outlet bin. In practice, such an operating constraint is untenable because, in a sorting process made up of a plurality of sorting passes, it happens frequently that the relative order of the items is changed between the two sorting passes, e.g. consequent upon unloading the sorting outlets into the bins, upon loading the items into the inlet of the machine after a bin has been dropped while the bins are being handled, upon transferring items from one bin to another, or upon the machine become jammed during the second sorting pass.

SUMMARY OF THE INVENTION

An object of the invention is to propose a method of sorting postal items that is improved and more robust in that it makes it possible to search for fingerprint matches without being dependent on the above-described operating constraint.

To this end, the invention provides a method of processing postal items, which method consists, during a first pass for sorting the items, in taking a digital picture of a postal item, in deriving from said picture a digital fingerprint which is a logic identifier for the item, and in storing the fingerprint of the item in a memory in correspondence with data about the item, and consists, during a second pass for sorting the items, in taking again a digital picture of a current mail item, in deriving from said image a digital fingerprint for the current item, and in searching the fingerprints recorded in the first sorting pass for a match with the fingerprint of the current item in order to retrieve the data about the item by association;

said method being characterized in that:

during the first sorting pass, said method further consists, in the memory, in associating the fingerprints of the successive items with corresponding chronological serial numbers; and during the second sorting pass, for a series of successive item fingerprints for which matches have been obtained with fingerprints recorded in the memory in the first sorting pass, said method further consists in retrieving a series of corresponding chronological serial numbers, in computing an estimated chronological serial number for a current item from said series of chronological serial numbers, and in searching for a match for the subsequent current item on the basis of the estimated chronological serial number.

The basic idea of the invention is thus, during the first sorting pass, to compile, in a memory, sequences of fingerprints corresponding to sequences of items that are likely to repeat themselves in full or in part in the second sorting pass. Said sequences of fingerprints can be defined on the basis of the chronological order in which the items are directed to a sorting outlet bin in the first sorting pass. During the second sorting pass, if the start of a sequence of items is detected on the basis of detection of a sequence of corresponding fingerprints, it is possible to predict, by estimation computation for a current item, the position of the fingerprint of the current item in an ordered sequence of fingerprints recorded in the first sorting pass.

With the method of invention, it is possible to search for a fingerprint match in a limited exploration space even if the items are out of sequence in the second sorting pass.

The method of the invention is easy to implement in an existing postal sorting installation and can be used in a sorting process made up of a plurality of passes through a plurality of sorting machines, e.g. assigned to outward sorting centers and to inward sorting centers.

BRIEF DESCRIPTION OF THE DRAWINGS

An implementation of the method of the invention is described in more detail below and is illustrated by the drawings. The description is given merely by way of indicative example that is in no way limiting to the invention.

In the drawings:

FIG. 1 is a very diagrammatic view of a postal item;

FIG. 2 diagrammatically shows a sorting machine for implementing the method of the invention;

FIG. 3 is a flow chart showing how the method of the invention proceeds during a first sorting pass;

FIG. 4 is a very diagrammatic view of the structure of the data stored in a memory of the sorting machine;

FIG. 5 is a flow chart showing how the method of the invention proceeds in a second sorting pass; and FIG. 6 is a graph showing the principle of the computation in the method of the invention.

FIG. 1 shows a postal item P bearing delivery address information A. The postal item can be merely a letter, or else it can be a flat object or "flat" of small or large format, such as a magazine, a newspaper, a catalogue with a wrapper made of plastic or paper, etc.

DETAILED DESCRIPTION OF THE INVENTION

The postal sorting machine 1 shown in FIG. 2 conventionally comprises: a feed inlet 2 with a loading zone for loading stacks of mail items P and an unstacker for putting the postal items on edge in series; a digital camera 3 for taking a picture of the surface of each postal item that bears the delivery address information A; and a bucket carrousel 4 that directs the items to the sorting outlets, each of which is provided with a sorting outlet bin 5. Each sorting outlet can be equipped with a plurality of sorting outlet bins (typically a front bin and a rear bin) or with a compartmented sorting outlet bin, without going beyond the ambit of the invention.

FIG. 2 also shows a data processing system referenced 6 and associated with a video coding system 7. The systems 6 and 7 constitute an optical character recognition (OCR) address recognition system which, on the basis of a picture of an item P taken by the camera 3, acts automatically or through action from a video coding operator, to extract the address information A on the basis of which a sorting destination corresponding to a sorting outlet of the machine is determined for postal item.

In addition, the system 6 is arranged in accordance with the invention to derive a digital fingerprint from the digital picture of a postal item taken by the camera 3, which fingerprint is a picture signature constituting a logic identifier for the item.

FIG. 2 also shows a system referenced 9 that is analogous to the system 6 but that is part of another sorting machine 10, said system 9 being connected to the system 6 for communication purposes, e.g. via a telecommunications network 8 for applying the method of the invention to a sorting process made up of a plurality of sorting passes through a plurality of sorting machines.

The method of the invention is applicable to automatic item sorting in which postal items are firstly sorted in a plurality of "outward" sorting centers, and after grouping, are sorted again in another sorting center for "inward" sorting that can be distant from the outward sorting centers.

FIGS. 3 and 5 show an implementation of the method of the invention when sorting is performed in two passes through the same sorting machine, such as the machine 1.

With reference to FIG. 3, in an initial step 11 of a first sorting pass, postal items P are injected into the sorting machine 1 via the feed inlet 2. The postal items P are unstacked and conveyed in series and on edge to the digital camera 3.

In step 12, a digital picture is taken of a mail item bearing the delivery address A.

In step 13, the system 6 undertakes automatic recognition of the address A by OCR, and, at the same time, derives a digital fingerprint V-ID from the digital picture of the postal item, which fingerprint serves as a logic identifier for the item.

In step 14, if unambiguous address information is obtained in step 13 by automatic OCR address recognition, data representative of the address information is stored in a memory in step 16 in correspondence with the digital fingerprint V-ID of the item.

If, in step 14, the automatic OCR address recognition gives a partial result, i.e. ambiguous address information, or indeed no result, the picture of the postal item is transmitted to the video coding system 7 for having the address information extracted by a video coding operator (step 15), whereupon the digital fingerprint and the data representative of the address information are recorded in correspondence in the memory in step 16.

In the method of the invention, in step 16, a chronological serial number SN is attributed to each item, which number is recorded in the memory in correspondence with the fingerprint of the item.

Each serial number can, for example, be constituted by the juxtaposition of a sorting center number assigned to the sorting center in which the sorting machine 1 is located, of a sorting machine number assigned to the sorting machine in which the postal item is sorted, of a sorting outlet bin number assigned to the sorting outlet bin to which the item is directed, and a chronological index assigned to the item.

In practice, said index is, for example, the value of a counter which is associated with a sorting outlet bin, which is initialized when a first item is directed to the bin, and which is incremented by one unit every time a new item is directed into the bin. In this manner, a serial number SN that is unique is assigned to each item.

In FIG. 3, reference 17 designates the structure of the database in which the digital fingerprint V-ID, the serial number SN, and the address data (not shown) of the item are recorded in correspondence for each item.

In step 18, the item is conveyed towards the corresponding sorting outlet of the machine and is unloaded into the bin associated with said sorting outlet.

The process symbolized by steps 12 to 18 is repeated for each postal item unstacked into the inlet of the machine.

At the end of the first sorting pass, if necessary and in the database 17, the recordings are grouped together logically so as to group together the fingerprints of the items by sequence.

In particular, in the database 17, the fingerprints are grouped together and ordered in series per sorting centre, per machine, and per bin, in the order in which the items are stored in each sorting outlet bin.

FIG. 4 shows two sequences of fingerprints in part. The first sequence comprises a series of fingerprints V-ID that are associated respectively with the chronological serial numbers 01407600 to 01407640 assigned to the items numbered "00" to "40" stored in bin "076" of sorting machine "40" in sorting center "01". The second sequence comprises another series of fingerprints V-ID that are associated respectively with the chronological serial numbers 014008600 to 014008640 assigned to the items numbered "00" to "40" stored in bin "086" of sorting machine "40" of the sorting center "01".

It should be understood that the database 17 is prepared for a second pass and is organized such that the fingerprints are recorded in sequence following the progression of the chronological serial numbers. Without going beyond the ambit of the invention, it is possible to record the fingerprints in a manner such as to compile sequences that are each assigned to two or more bins.

FIG. 5 shows the steps of the method of the invention in a second sorting pass.

The items in the first-pass sorting outlet bins 5 are fed back into the sorting machine 1 and are unstacked so as to be conveyed in series and on edge towards the camera 3.

In step 51, a digital picture is taken again of the surface of a current item that bears the address information A, and, in step 52, a fingerprint V-ID is derived again for the current item on the basis of its digital picture, that fingerprint being referred to as the "current fingerprint".

In step 52, a "current" pass index PI is also attributed to the current item. In other words, the successive items are counted, and a pass number (ranging from 1 to n) is attributed to the current item.

In step 54, an estimated chronological serial number SN is computed for the current item. In the invention, this computation is performed by linear approximation on the basis of a series of chronological serial numbers stored in the memory in a "prediction" data list 53. At the beginning of the second sorting pass, said prediction data list is empty.

In order to understand the principle of the computation better, on the graph of FIG. 6, pass indices PI for items 374 to 405 are plotted along the x-axis, those indices corresponding to the second pass of items 374 to 405 for which digital fingerprints V-ID have been extracted in step 52. Examples of chronological serial numbers SNs assigned to items in the first pass (items stored in bins numbered "76" and "86" in this example) are plotted up the y-axis.

The computation by linear approximation consists, on the basis of a series of item pass index and chronological serial number (PI, SN) pairs shown by crosses in FIG. 6, in determining by an equation system the coefficients $\underline{a}$, $\underline{b}$ of a straight line (SN=a.PI+b) such as D1 or D2 so as then to be able to compute a chronological serial number SN placed on said straight line as a function of a current pass index PI.

In the method of the invention, the dispersion of the pass index and chronological serial number pairs recorded in the prediction data list 53 is also measured by using a measurement such as root mean square error (RMSE) which is the subject of step 56.

At the beginning of the second sorting pass, since there are not yet enough pass index and chronological serial number pairs in the prediction data list 53, the step 56 goes directly to step 57 in which a search is made for a match between the current fingerprint and a fingerprint recorded in the database 17 by scanning the entire database 17 in full.

If no match is obtained in step 58, the current item is sent to a reject outlet.

If a match is obtained in step 58, then, on the basis of the matching fingerprint, the address data of the item and the chronological serial number associated with the fingerprint are retrieved from the database 17.

In step 60, the current item is directed towards a corresponding sorting outlet, and, in step 61, the pass index and chronological serial number pair associated with the current item is recorded in the prediction data list 53. For example, for the postal item whose pass index PI is 374, a match is detected between its digital fingerprint and the digital fingerprint recorded in the database 17 and whose serial number SN is 014008628 (see FIG. 4).

The process of the steps 51 to 61 as indicated above is repeated in this way for successive current items and if, for example, for five successive current items (about $\frac{1}{20}^{th}$ of the storage capacity of a sorting outlet bin), five respective fingerprint matches have been obtained, then, after the fifth current item, a series of five pass index and chronological serial number pairs has been compiled in the prediction data list 53.

For a subsequent current item (e.g. the pass index item equal to 379 in FIG. 6) succeeding the items of pass indices 374 to 378, the last five pass index and chronological serial number pairs recorded in the prediction data list 53 are linearly approximated in step 54, and coefficients of a straight line such as D1 are obtained.

In step 56, the distances of the points constituted by the last five position index and chronological serial number pairs of the prediction list 53 from the straight line D1 are measured, e.g. by means of an RSME measurement.

If, in step 56, the measured RSME is zero, i.e. if the series of the last five pass index and chronological serial number pairs recorded in the data list 53 are aligned exactly on a straight line such as D1, the process is continued at step 62 by computing, for the current pass index (index 379 in this example), the corresponding estimated chronological serial number on the straight line D1 (in the example, the estimated chronological serial number is 8633), and a search for a fingerprint match is conducted in step 63 for a match between the current fingerprint and the fingerprints contained in an exploration space of the database 17 that is constituted by the vicinity of the fingerprint associated with the estimated chronological serial number. The exploration vicinity can, for example, be limited to about forty fingerprints situated on either side of said associated fingerprint in the database 17.

If, in step 56, the measured RMSE is zero, the coefficients $\underline{a}$ and $\underline{b}$ of the straight line obtained at 54 is stored in the memory. It is understood that, when the RMSE is zero, a "perfect" sequence of items has been found in the second sorting pass, i.e. a sequence in which five successive items are in the same chronological order as in the first sorting pass. The pass index and chronological serial number pairs constituting the perfect sequence are shown in FIG. 4 by the reference PS and in FIG. 6 by the straight line D1. In addition, for any further zero RMSE measurement, the coefficients $\underline{a}$ and $\underline{b}$ are replaced in the memory.

If a match is found between the current fingerprint and one of the fingerprints in the exploration space in step 64, the current item is directed to a corresponding sorting outlet in step 60, and, in step 61, the prediction data list 53 is updated with the pass index and chronological serial number of said current item. It should be noted that, in the example, for the pass index 379, the chronological serial number of the matching fingerprint is 8634 while the estimated chronological serial number is 8633.

If, in step 64, no fingerprint match is found in the exploration space, the database 17 is scanned in full in step 57 in order to search for a fingerprint match, as indicated above. Whereupon, the item can be directed to a reject outlet (steps 58 and 59) or can be directed to a sorting outlet (step 60) with the prediction data list 53 being updated (step 61).

If, in step 56, the measured RMSE is less than said certain threshold (e.g. 5) but is not zero, then, in accordance with the invention, two estimated chronological serial numbers are computed for the current pass index in step 65. This is shown in FIG. 6 for the current pass index 386. The first serial number is computed for the current pass index (386) on the basis of the stored coefficients $\underline{a}$ and $\underline{b}$ of the straight line D1.

In the example, the corresponding chronological serial number on the straight line D1 is 8640. The second chronological serial number is computed on the basis of a straight line D2 obtained by linear approximation (step 54) of the last five position index and chronological serial number pairs in the prediction data list 53. In the example, the second corresponding chronological serial number on the straight line D2 is 8638.

In step 66, the distance between the first and the second computed chronological serial numbers is measured, and if said distance is less than or equal to a certain threshold, the process continues in step 63 with a search for a fingerprint match in an exploration space centered around the first computed chronological serial number, and, if said distance is greater than said threshold, the process continues in step 57 with a search for a fingerprint match on the entire database 17. In practice, the threshold value in step 66 can be equal to 2.

In the example, the distance between the first computed chronological serial number (8640) and the second computed chronological serial number (8638) is two. In step 63 a match is searched around the chronological serial number 8640 in the database 17. If no match is found in step 64, the process continues in step 57.

When a match is found in one of the steps 58 or 64, the item is directed, in step 60, to the corresponding sorting outlet, and the prediction data list 53 is updated in step 61.

In the example, in step 61, the current pass index 386 and chronological serial number 8641 pair is recorded in the prediction data list 53, a match between the current digital fingerprint and the fingerprint in the data base 17 having the chronological serial number 8641 having been determined in one of the steps 58 or 64 of the method.

With the method of the invention, it is thus possible to perform a fingerprint match search over a limited exploration space even if the items are injected into the machine in the second sorting pass out of sequence.

The method of the invention is applicable in the same way to a sorting pass subsequent to the second sorting pass and to sorting passes subsequent to the second pass and to sorting passes performed on different machines. For sorting passes performed on different sorting machines, the databases 17 compiled on the various sorting machines in the first passes are transferred via a telecommunications network such as 8 to the second-pass sorting machine where they are grouped together to compile sequences of fingerprints as described above.

The invention claimed is:

1. A method of processing postal items, which method comprises the following steps during a first pass for sorting the items:
    taking a digital picture of a postal item,
    deriving from said picture a digital fingerprint which is a logic identifier for the item, and storing the fingerprint of the item in a memory in correspondence with data about the item, and
the method comprises the following steps during a second pass for sorting the items:
    taking again a digital picture of a current mail item,
    deriving from said image a digital fingerprint for the current item, searching the fingerprints recorded in the first sorting pass for a match with the fingerprint of the current item in order to retrieve the data about the item by association,
    sorting a current item by directing it toward a sorting outlet provided with sorting outlet bins if said match is obtained, and
    rejecting the current item by sending it to a reject outlet if no match is found, wherein said method further comprises during the first sorting pass:
    associating in the memory the fingerprints of the successive items with corresponding chronological serial numbers, chronological order being the order in which the items are loaded into the sorting outlet bins and
during the second sorting pass, the method further comprises:
    recording data relative to matching obtained between fingerprints from second sorting pass fingerprints recorded in the memory in the first sorting pass,
    retrieving, for a series of successive item fingerprints which number equal to a certain threshold and for which matches have been obtained with fingerprints recorded in the memory in the first sorting pass, a series of chronological serial numbers associated with said matching fingerprints recorded in the memory in the first sorting pass,
    computing an estimated chronological serial number for a current item by means of a linear approximation from said series of chronological serial numbers, and
    searching for a match with the fingerprint of the current item on the basis of the estimated chronological serial number to limit exploration space for matching fingerprints, and
    during the second sorting pass, if no series of successive item fingerprints matching with fingerprints recorded in the memory in the first sorting pass can be obtained for a number of successive item fingerprints equal to said certain threshold, the method comprises:
    scanning, in full, fingerprints recorded in the first sorting pass until a match is found with the fingerprint of the current item is obtained.

2. A method according to claim 1, in which two chronological serial numbers are computed by linear approximation on the basis of two series of successive item fingerprints, and a distance between the two computed chronological serial numbers is measured.

3. A method according to claim 1, in which the search for a match is performed on the fingerprints recorded in the first sorting pass in an exploration space centered around the fingerprint associated with a computed chronological serial number.

4. A method according to claim 1, in which the chronological serial number is constituted by the juxtaposition of a sorting center number, of a sorting machine number, of a sorting outlet bin number, and of a chronological index corresponding to chronological order in which the items are loaded into the sorting outlet bins.

5. A method according to claim 1, in which a first chronological serial number is computed on the basis of a series of successive item fingerprints for which a number of successive items in second sorting pass equal to said threshold is in the same chronological order as in the first sorting pass, a second chronological serial number is computed by linear approximation on the basis of a series of successive last item fingerprints equal to a certain threshold for which matches have been obtained with fingerprints recorded in the memory in the first sorting pass, and a distance between the first and second computed chronological serial numbers is measured to compute an estimated chronological serial number for a current item.

6. A method according to claim 1, in which said certain threshold is equal to five.

7. A method according to claim 1, in which said certain threshold is ½0th of the storage capacity of a sorting outlet bin.

\* \* \* \* \*